United States Patent [19]

Konstant

[11] Patent Number: 5,170,896
[45] Date of Patent: Dec. 15, 1992

[54] PALLET RETURN PALLET RACK SYSTEM
[75] Inventor: Anthony N. Konstant, Winnetka, Ill.
[73] Assignee: Konstant Products, Inc., Skokie, Ill.
[21] Appl. No.: 851,859
[22] Filed: Mar. 16, 1992
[51] Int. Cl.⁵ ............................................... A47F 5/00
[52] U.S. Cl. .................................. 211/151; 211/59.2; 414/276
[58] Field of Search .................. 211/151, 59.2, 162; 414/276, 286

[56] References Cited

U.S. PATENT DOCUMENTS

| | | | |
|---|---|---|---|
| 4,341,313 | 7/1982 | Doring | 211/151 |
| 4,462,500 | 7/1984 | Konstant et al. | 211/151 |
| 4,613,270 | 9/1986 | Konstant et al. | 211/151 X |
| 4,687,404 | 8/1987 | Seiz et al. | 211/151 X |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,982,851 | 1/1991 | Konstant | 211/151 |
| 4,988,251 | 1/1991 | Kinney | 211/151 X |
| 5,080,241 | 1/1992 | Konstant | 211/151 |

Primary Examiner—Robert W. Gibson, Jr.
Attorney, Agent, or Firm—Niro, Scavone, Haller & Niro

[57] ABSTRACT

A pallet return pallet rack storage system of the push-back rack type is provided where the wheeled carts may be selectively and automatically transferred from a pair of feed rails to a pair of return rails.

23 Claims, 7 Drawing Sheets

PALLET RETURN PALLET RACK SYSTEM

BACKGROUND OF THE INVENTION

The present invention relates generally to pallet rack storage systems and more particularly, to pallet return pallet rack storage systems that selectively, efficiently and automatically return unloaded carts and pallets from a storage position where they may be unloaded to a return or loading position where they may be reloaded.

An important consideration in the storage or warehouse industry is the ability to safely and efficiently load and unload stored products while maintaining the highest possible storage density within a particular storage area. To this end, storage systems have been developed that utilize wheeled carts which ride on spaced, parallel rails. The wheeled carts are designed to carry and support the pallets and the loads that are placed on the pallets. Systems of this type are generally designed to accommodate a number of carts (and associated pallets and loads) and are referred to as pushback rack systems. These systems generally operate on a first in, last out inventory basis; that is, both loading and unloading take place from the same access aisle.

One such system, for example, is described in U.S. Pat. No. 4,773,546. In this system, multiple wheeled carts are provided which are designed to carry pallets and their loads. The wheeled carts roll on a pair of spaced, sloping, parallel rails and are proportioned to permit the multiple carts to overlap one another when in a forward, unloaded position. In operation, a pallet and load is placed on an upper cart. To store a second load, the second load is used to push the first cart and load rearward and the second load is placed on a lower cart. In a three deep system, a third load may be used to push the first and second carts rearward and the third load and pallet placed on the rails. The process is reversed for unloading. Efficient storage of multiple pallets, as well as increased storage density, is achieved with this system.

Another known pushback rack system having wheeled carts in rolling engagement with spaced, parallel rails is disclosed in U.S. Pat. No. 4,915,240. Pushback rack systems of this type utilize an increased number of wheeled carts without the necessity for increasing the number of rails, which is accomplished by using interlocking cart wheels which ride on the same rail rolling surface. In this manner, a single storage bay and/or pair of rails provides convenient and efficient storage of pallets and their loads that are multiple pallets deep. Improved storage density is provided while fewer access areas are required so that efficiency, ease of access and capacity is increased.

In the use of pushback rack systems, the carts are generally loaded and unloaded from the same access aisle. As a result, empty or broken pallets have to be physically removed from the carts by the operator and stored for re-use or discarded. In certain types of warehousing operations, this may decrease the efficiency of the loading/unloading process and increase the possibility of injury to the operator and damage to the equipment. Moreover, storage systems of this type cannot be readily adapted to operate under the first in, first out inventory basis.

SUMMARY OF THE INVENTION

The present invention preserves the advantages of known pushback rack and other pallet rack storage systems. In addition, the present invention provides new advantages not found in currently available systems and overcomes many of the disadvantages that may be associated with known devices.

Therefore, an object of the present invention is to provide a pallet return pallet rack system where unloaded, wheeled carts and pallets are selectively and automatically returned from an unloading end to a loading end without the operator having to physically remove the pallet or cart.

Another object of the present invention is to provide a pallet return pallet rack system that automatically transfers unloaded carts and pallets from an unloading end and returns them to a loading end where they may be conveniently stored, repositioned or re-used.

An additional object of the present invention is to provide a pallet return pallet rack system that can store loads of multiple pallets deep in a first in, first out inventory basis and automatically transfer unloaded carts for subsequent loading from a different access aisle.

A further object of the present invention is to provide a pallet return pallet rack system where the return of unloaded carts and pallets is selectively accomplished through an easily operable and convenient release mechanism.

Still another object of the present invention is to provide a pallet return pallet rack system having wheeled carts that operate in rolling relation to an upper pair of rails and are capable of automatic transfer to a rolling relation with a lower pair of rails.

Still an additional object of the present invention is to provide a pallet return pallet rack system having wheeled carts that securely retain pallets during loading and during the transfer of the carts from the unloading end to the loading end.

Still a further object of the present invention is to provide a transfer means for the automatic return of unloaded carts and pallets to a loading end without interfering with the rolling relationship and/or lateral alignment of the carts on the upper or lower pair of rails.

Yet another object of the present invention is to provide protection for the wheels of the carts during all phases of operation, and to provide a guide for proper guide means to keep the carts in proper alignment during all phases of operation.

Yet an additional object of the present invention is to provide an automatic pallet return pallet rack system that can be used in combination with multiple rack systems, and that can be used in conjunction with other types of pallet storage systems.

Yet a further object of the present invention is to provide a pallet return pallet rack system that is safer, easier to use and more efficient than known storage systems.

In accordance with the present invention, a pallet return pallet rack system is provided utilizing a two-level rail system, wheeled carts in rolling relation to each of the rail systems, a transfer assembly and a release mechanism. The rail system includes at least one pair of spaced, parallel feed rails and at least one pair of spaced, parallel return rails. The feed rails and return rails each have an unloading (front) end, a loading (rear) end as well as a rolling surface. At least one cart having wheels is provided which is capable of rolling engagement with the feed rails and which is capable of being automatically transferred to rolling engagement with the return rails which are positioned and operable below the feed rails. The present invention further includes a transfer means which enables the cart to be automatically transferred from the unloading end of the feed rails to rolling engagement with the front end of the return rails without the transfer means interfering with the alignment or smooth operation of the cart on the feed rails and the return rails. A release mechanism is also provided which permits the selective transfer of carts from the feed rails to the return rails, as well as permitting the loaded cart to remain in a storage position. Moreover, the feed rails are sloped upwardly from the front end to the rear end at a gradual angle and the return rails are sloped downwardly from the front end to the rear end at a gradual angle. The upward slope of the feed rails permits the smooth flow of loaded carts to the unloading end for storage and/or unloading. After the cart has been unloaded and transfer selectively initiated by activation of the release mechanism, the cart is automatically transferred from the feed rails to a rolling engagement with the return rails. The downward slope of the return rails then permits the smooth flow of the carts to the loading end where the carts and pallets may be repositioned on the rear end of the feed rails or stored for subsequent use.

BRIEF DESCRIPTION OF THE DRAWINGS

These and other features, objects and advantages of the present invention will become apparent from the following description and drawings wherein like reference numerals represent like elements in the several views, and in which.

DETAILED DESCRIPTION OF THE PREFERRED EMBODIMENTS

Figure 1:
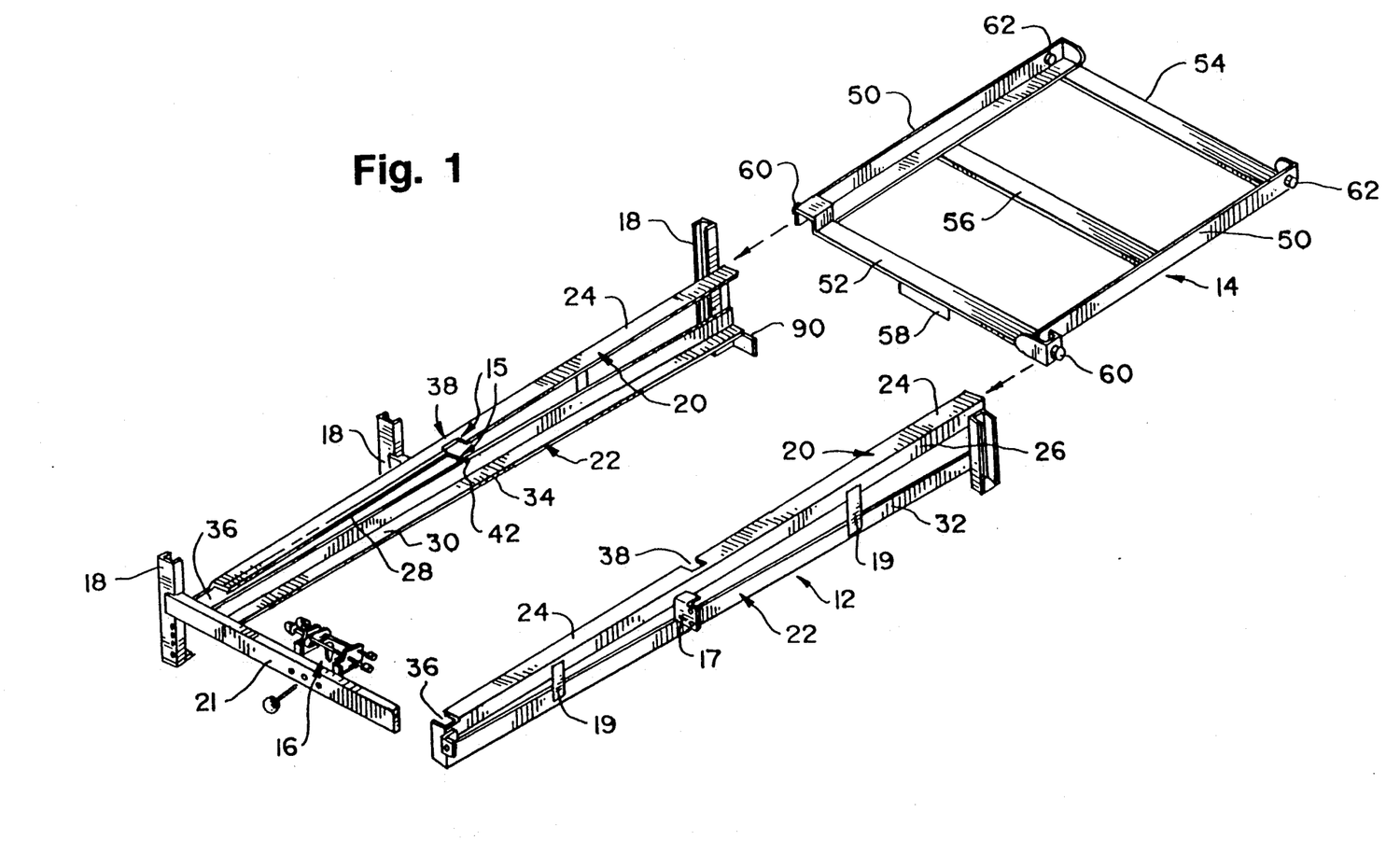
FIG. 1 is an exploded perspective view of the present invention with portions removed to reveal aspects of the invention.

The pallet return pallet rack system of the present invention is shown generally in FIG. 1 and consists of three basic assemblies. Specifically, a two-level rail system is provided and shown generally as 12; a cart assembly having wheels and designed to carry a pallet and support a load is provided and shown generally as 14; a transfer means is provided, shown generally as 15; and, a release mechanism is provided, shown generally as 16.

The rail system 12 is typically supported by upright columns 18 that are in turn part of an overall support structure (not shown). Rail system 12 may be further connected to upright columns 18 by brackets 17 or other well known means. The pallet return pallet rack system of the present invention may be stacked one on top of another as part of a rack structure (not shown), or installed in side-by-side relationship within a single storage bay (not shown). As used herein, and as shown on FIG. 1, front end refers to an unloading end which is generally associated with an aisle for workers and equipment to unload (not shown). The rear end, as used herein, refers to a loading end which is also generally associated with an aisle for workers and equipment used in loading (not shown).

Figure 2:
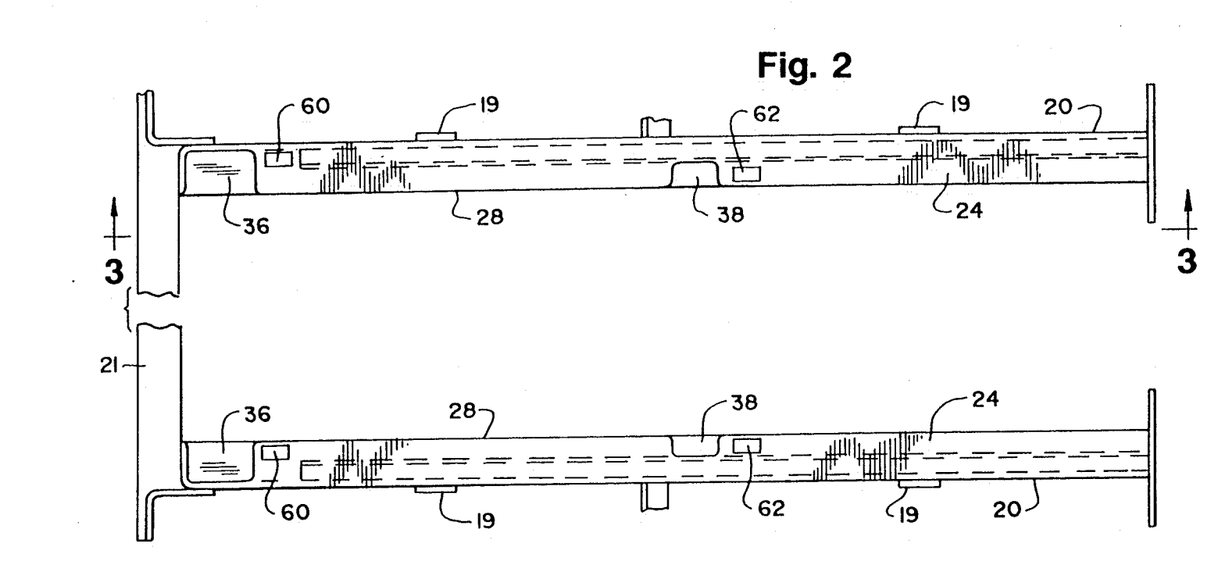
FIG. 2 is a top elevational view of the feed rails of the present invention.
Figure 3:
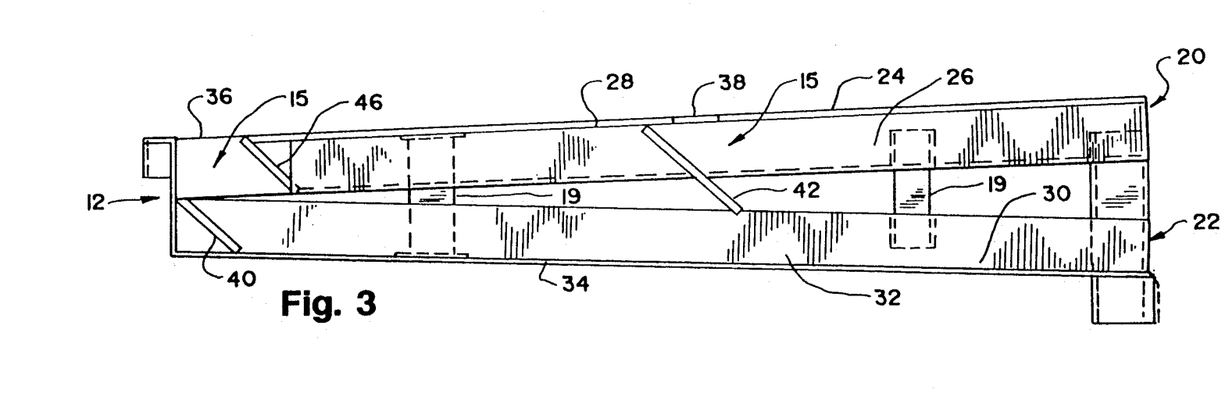
FIG. 3 is a side elevational view of a left-hand portion of the rail system of the present invention taken along Section 3—3 of FIG. 2.
Figure 4:
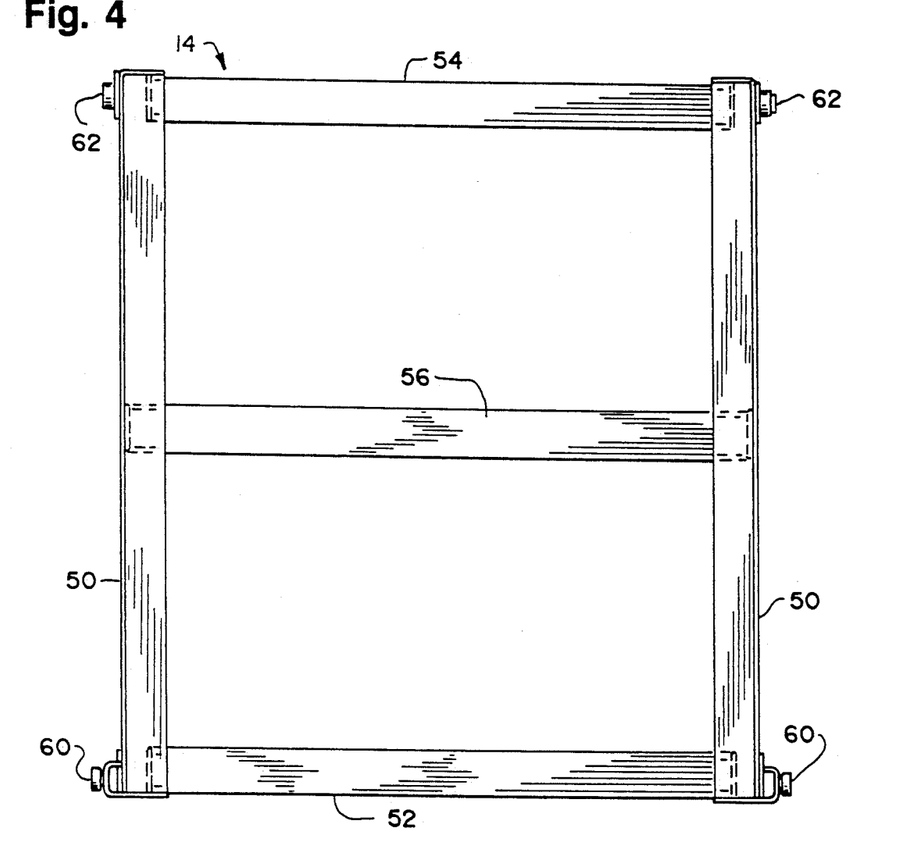
FIG. 4 is a top elevational view of a cart of the present invention.
Figure 5:
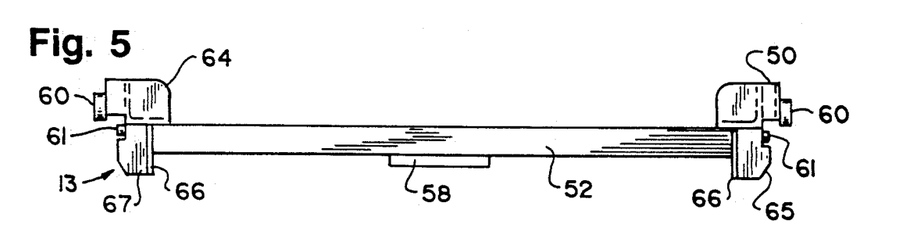
FIG. 5 is a front elevational view of a cart of the present invention.

Details of the rail system 12 of the present invention may best be seen by reference to FIGS. 1, 2 and 3. Rail system 12 consists of at least one pair of spaced, parallel feed rails 20 and at least one pair of spaced, parallel return rails 22. Feed rails 20 are positioned above return rails 22 and are sloped upwardly from the front end to the rear end at a gradual angle. Return rails 22 are sloped downwardly from the front end to the rear end at a gradual angle. A front aisle beam 21 is provided which connects the pair of feed rails 20 to the pair of return rails 22. If desired, extra support for the rail system 12 may be provided by braces 19, which interconnect feed rails 20 and return rails 22 at any desired spacing along their length.

Feed rails 20 have a rolling surface 24, a web portion 26 and a guide edge 28. Return rails 22 also have a rolling surface 30, a web portion 32 and a guide edge 34. Web portions 26 and 32 provide support and rigidity to the rail system 12 and may also be used to help secure rail system 12 to columns 18, or brackets 17. FIG. 3 shows a left-hand portion (when viewed from the unloading or front end) of rail system 12, and it will be readily understood by those of ordinary skill in the art that the right-hand portion of rail system 12 is a mirror image of the left-hand portion. In addition, although angle members are shown for the feed and return rails 20 and 22 in the preferred embodiments, it will be readily understood that other structural members having different cross-sectional shapes may be employed to practice the inventions.

Feed rails 20 are provided with front notches 36 and rear notches 38. In a preferred embodiment of the present invention, front notches 36 are a depth of substantially all of rolling surface 24 and rear notches 38 are of a depth less than front notches 36. In particular, rear notches 38 are depth-proportioned to permit a pair of front wheels 60 of cart 14 to roll forward on riding surfaces 24 of feed rails 20, past and unobstructed by rear notches 38. Front notches 36 are of a width sufficient to accommodate the through passage of front wheels 60 of cart 14. Rear notches 38 are also of a width sufficient to accommodate the through passage of a pair of rear wheels 62 of cart 14. Rear notches 38 are located rearward along upper riding surface 24 a distance that coincides with the distance between front wheels 60 and rear wheels 62 of cart 14. In this manner, transfer of cart 14 may be accomplished. However, other transfer means 15 will be apparent to those of ordinary skill in the art.

With reference to FIGS. 1 and 3, a pair of front return ramps 40 and a pair of rear return ramps 42 may be provided to cooperate with front notches 36 and rear notches 38, respectively. Front return ramps 40 and rear return ramps 42 are substantially the same width as rolling surfaces 24 and 30. A pair of front guide members 46 may also be provided, if desired. Front return ramps 40 and rear return ramps 42 are positioned at a downward angle from the front end to the rear end of rail system 12. Front return ramps 40 are positioned below front notches 36 and are secured to web portions 32 and rolling surfaces 30 of return rails 22. Rear return ramps 42 are positioned under rear notches 38 and are secured to web portions 26 of feed rails 20 and web portions 32 of return rails 22. As shown with respect to the preferred embodiments, transfer means 15 is in the form of notches 36 and 38 in conjunction with front and rear return ramps 40 and 42.

It should be understood, however, that the present invention is not limited to transfer means 15 having front and rear return ramps 40 and 42. In fact, although ramps 40 and 42 provide smooth transfer and operation, satisfactory operation is achieved without the utilization of either or both front and rear return ramps 40 and 42 or front guide members 46. If rear return ramp 42 is utilized, however, it will be understood that adequate clearance must be provided under ramp 42 to permit cart assembly 14 and its wheels 60 to pass without obstructing rolling operation.

In the general operation of a preferred embodiment of the present invention, front and rear return ramps 40 and 42 cooperate with front and rear notches 36 and 38, as cart 14 is transferred from a rolling engagement with feed rails 20 to a rolling engagement with the return rails 22 via front and rear notches 36 and 38. As will be hereinafter described, the storage, transfer and return of cart 14 is automatically accomplished by transfer means 15 through the selective activation of release mechanism 16, which permits front wheels 60 to pass through the front notches 36 and rear wheels 62 to pass through rear notches 38 (see FIG. 1B). In addition, guide means 13 (FIG. 7) may also be provided to ensure proper lateral alignment of cart 14 when in rolling relation to feed rails 20 and during transfer to and rolling relation of cart 14 on return rails 22.

The details of cart assembly 14 may best be seen with reference to FIGS. 1 and 4 through 7. The frame of cart assembly 14 consists of side angle members 50, front member 52, rear member 54 and any additional number of cross members 56 that may be necessary to support a given load. Side members 50 are secured to cross members 52, 54 and 56, which together form the load bearing surface of cart assembly 14. A stop plate 58 may also be provided, which may be secured to front member 52.

As indicated, cart assembly 14 includes a pair of front wheels 60 and a pair of rear wheels 62. Front wheels 60 are rotatably mounted to a front portion of side angles 50 by brackets 64. In addition to mounting front wheels 60 to side members 50, brackets 64 also serve to extend the front wheels 60 laterally outside the width of cart 14 a distance greater than rear wheels 62 an amount sufficient for the front wheels 60 to roll forward on rolling surfaces 24 of feed rails 20 without interference from or passing through rear notches 38. Brackets 64 may be configured to further serve, if desired, to retain a pallet (not shown) on the cart frame during the return phase of operation as hereinbefore and hereinafter described. Rear wheels 62 are rotatably mounted to side channels 50 and are spaced laterally from the side channels 50 such that when rear wheels 62 are in rolling engagement with upper rolling surfaces 24, they will intersect rear notches 38, when desired, through selective activation of release mechanism 16.

Figure 6:
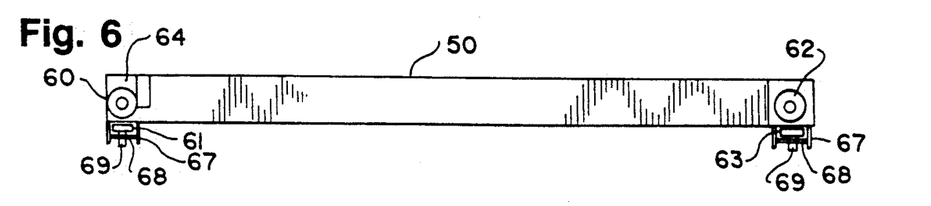
FIG. 6 is a side elevational view of the right-hand side of a cart of the present invention.
Figure 7:
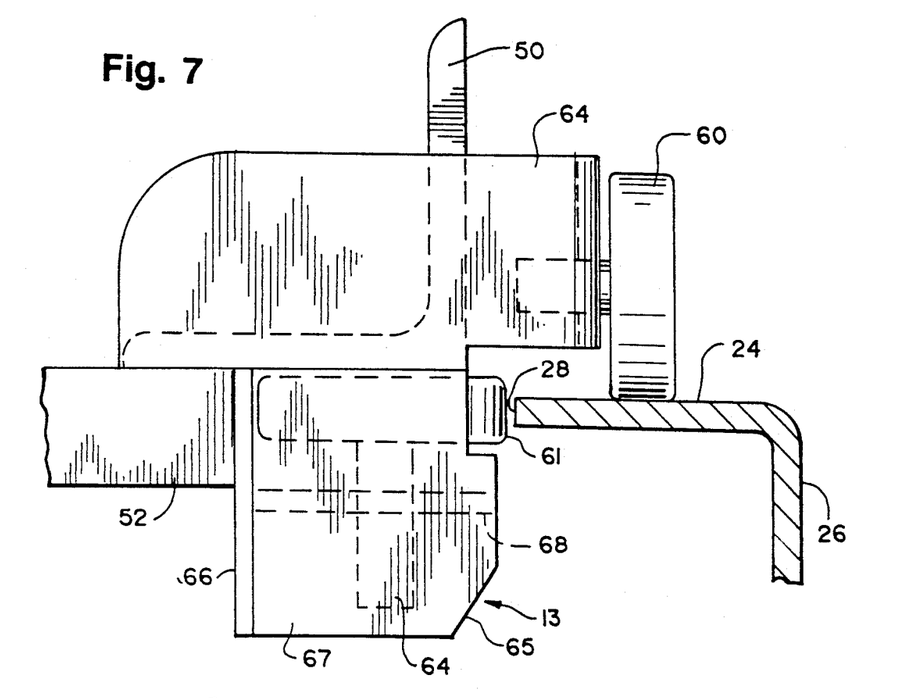
FIG. 7 is a front detailed view of a right-hand front portion of the wheels and guide wheels of a cart of the present invention shown in rolling engagement with the right-hand feed rail.

Cart 14 may be further provided with a pair of front guide wheels 61 and a pair of rear guide wheels 63 (see FIGS. 1, 6 and 7). Front guide wheels 61 and rear guide wheels 63 are positioned adjacent to the guide edges 28, keeping cart assembly 14 in proper lateral alignment and providing smooth operation as cart assembly 14 rolls along feed rails 20. Similarly, when cart assembly 14 is transferred to and in rolling engagement with return rails 22, guide wheels 61 and 63 cooperate with guide edges 34, providing proper lateral alignment and smooth operation of cart assembly 14 as it rolls along return rails 22.

As best shown in FIG. 7, front and rear guide wheels 61 and 63 may be secured to cart assembly 14 using a structural steel member having an "I" or "H" cross-section which includes a flange portion 67 and web portion 68. Flange portion 67 is secured to front beam 52 and side member 50. In this manner, web portion 68 is positioned to rotatably secure an axle 69 of front guide wheels 61. In like manner, the rear guide wheels 63 are secured to cart assembly 14. A plate 66 may also be provided to aid in securing the structural member to beams 52 and/or side members 50. A similar plate may also be provided to the rear of rear guide wheels 63 (not shown). In this manner, the front and rear guide wheels 61 and 63 are protected as cart 14 moves along feed rail 20, during transfer and as cart 14 moves along return rail 22. Flange portion 67 may extend slightly beyond the guide wheels 61 and 63 to protect the guide wheels from damage. Such a configuration does not interfere with smooth operation and transfer, since there may be a limited amount of play between the guide wheels 61 and 63 and the guide edges 28 and 34. In addition, the guide wheel assemblies may act as legs for cart assembly 14 when it is on the ground or other flat surface and also serves to raise the cart to permit easy access by a fork lift or similar device during loading or unloading.

It will be apparent to those of ordinary skill in the art that there are other methods to guide the cart during operation as well as to attach guide wheels 61 and 63 to cart assembly 14 with other structure members while still achieving the desired guiding functions. For example, fixed guides (not shown) may be used which may be affixed along the sides of cart 14 or elsewhere, in a location to provide the desired guiding function. Nylon, teflon or similar pads or strips may be employed, if desired. Additionally, as shown in FIG. 7, flange portion 67 may have a chamfered corner 65 that aides in alignment of cart 14 as it is transferred from feed rails 20 to return rails 22. Accordingly, the various guide elements described herein, as well as equivalent means, may be used alone or in combination to achieve the desired and automatic guide function during transfer and for proper lateral alignment as cart 14 rides on rails 20 and 22. Although the present invention may be practiced without the use of guides, guides are generally preferred.

With reference to FIGS. 1 and 8 through 10, a release mechanism 16 of the present invention may best be understood. A preferred embodiment of the release mechanism 16 of the present invention can best be seen by reference to FIGS. 8 and 9. Release mechanism 16 consists of bracket 82, fixed axle 72, free or rotatable axle 74 and handle 78. Bracket 82 may be secured to the underside of front aisle beam 21 or alternatively, on the rearward side of aisle beam 21 (not shown) by welding or other means readily known to those of ordinary skill in the art. At least each end of fixed axle 78 is rotatably mounted to bracket 82 by means that will be apparent to those of ordinary skill. A plurality of links 76 are provided which are fixedly secured at one end to fixed axle 72 and at their other end are adapted to rotatably receive free axle 74. In the described embodiment, links 76 serve to retain fixed axle 78 within bracket 82. Each end of free axle 74 is provided with a rotatably mounted resilient bumpers 77 using washers 73 and other means readily known to those of ordinary skill in the art. Handle 78 is rotatably mounted on free axle 74 and hangs below front aisle beam 21 (see FIG. 9) an amount sufficient for desired operation. Springs 85 are also provided to automatically bias free axle 74 and resilient bumpers 77 into an upper, stopped position.

Figure 8:
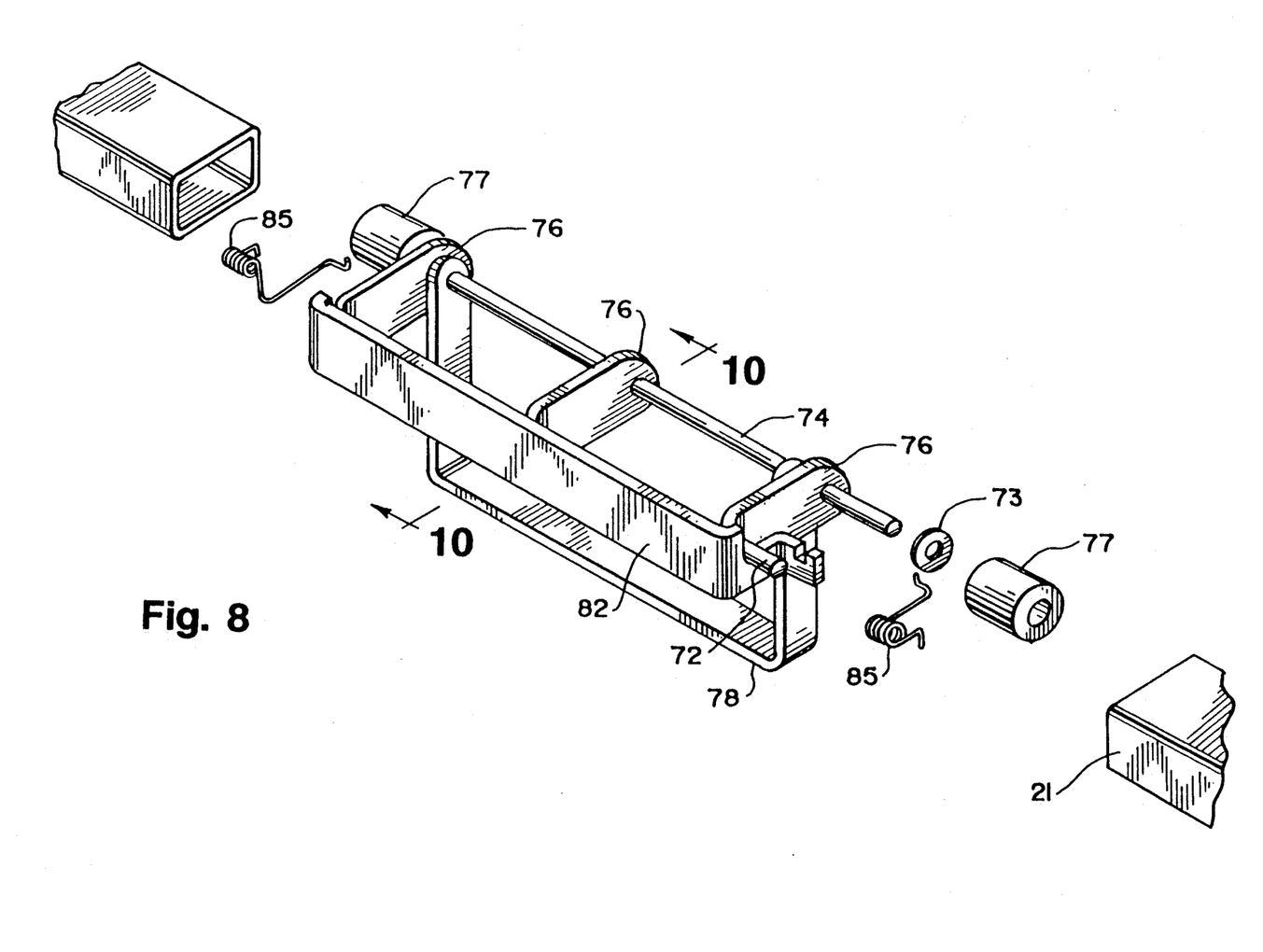
FIG. 8 is an exploded perspective view of a release mechanism of the present invention.
Figure 9:
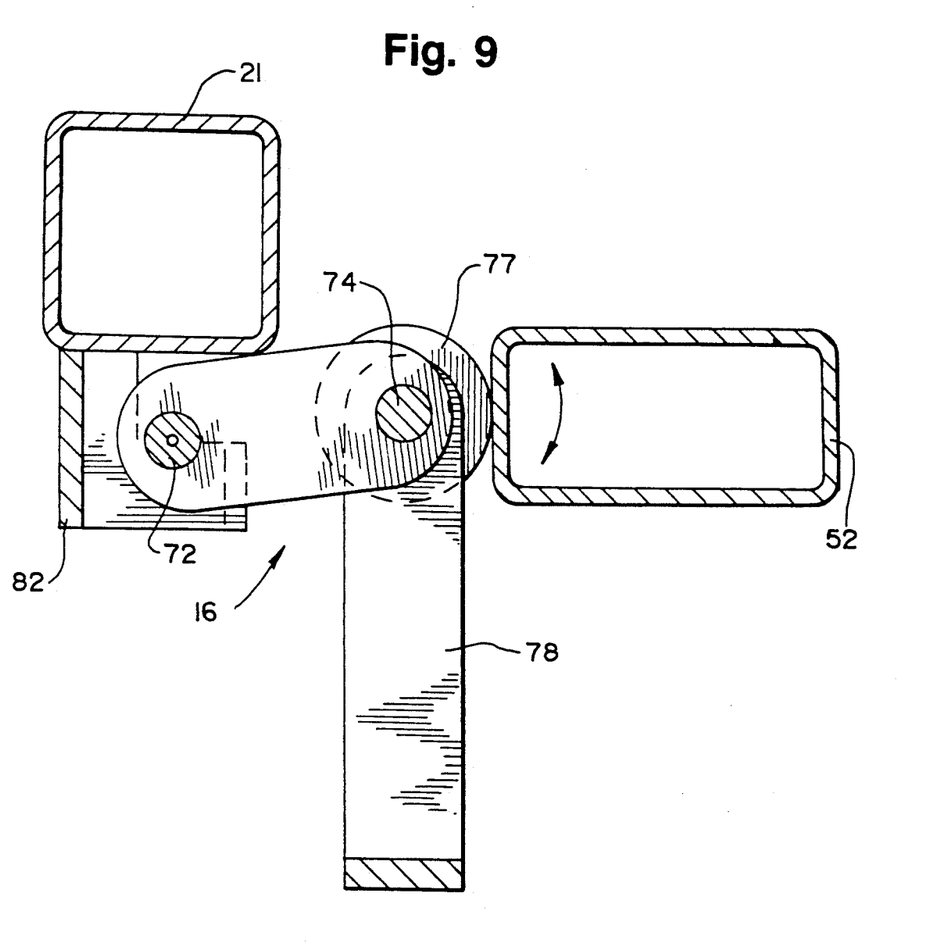
FIG. 9 is a cross-sectional view of a release mechanism of the present invention shown engaged with a cart member showing the cart in a storage position; and, FIG. 10 is an exploded perspective view of an alternate embodiment of a release mechanism of the present invention taken along Section 10—10 of FIG. 8.

As shown in FIGS. 1, 8 and 9, release mechanism 16 protrudes into rail system 12 and is positioned such that when cart 14 is in rolling engagement with feed rails 20, front stop 58 of cart 14 is engaged by and prohibited from further forward movement by free axle 74 and its resilient bumpers 77. Alternatively, front member 52 of cart assembly 14 may itself be engaged by free axle 74 and resilient bumpers 77 (see FIG. 9). In this stop or storage position, the front wheels 60 are maintained in a position behind front notches 36 and rear wheels 62 are maintained in a position to the rear of rear notches 38 (FIGS. 1A and 3).

To activate the release mechanism, handle 78 is pulled downward. This allows free axle 74 to rotate downward and become disengaged from front stop 58 or front member 52. Cart 14 is thus allowed to roll completely forward until the front wheels 60 meet front notches 36 and rear wheels 62 meet rear notches 38. In this manner, cart 14 is allowed to fall through the front and rear notches 36 and 38 and is automatically transferred to a rolling engagement with the return rails. As cart assembly 14 is transferred, front and rear return ramps 40 and 42 help to guide the wheels of cart assembly 14 and help to smoothly transfer cart 14 between feed rails 20 and return rails 22. As the front stop 58 or front member 52 passes free axle 74 of release mechanism 16, springs 85 bias handle 78 upward causing free axle 74 to rotate upward to its stopped position to enable subsequent cart assemblies 14 to be retained in the storage position. It will be understood by those of ordinary skill in the art that release mechanism 16 may be configured such that it operates in an opposite direction, i.e., the handle 78, and the other components may be configured to achieve the desired operation by pulling the handle 78 upward.

Figure 10:
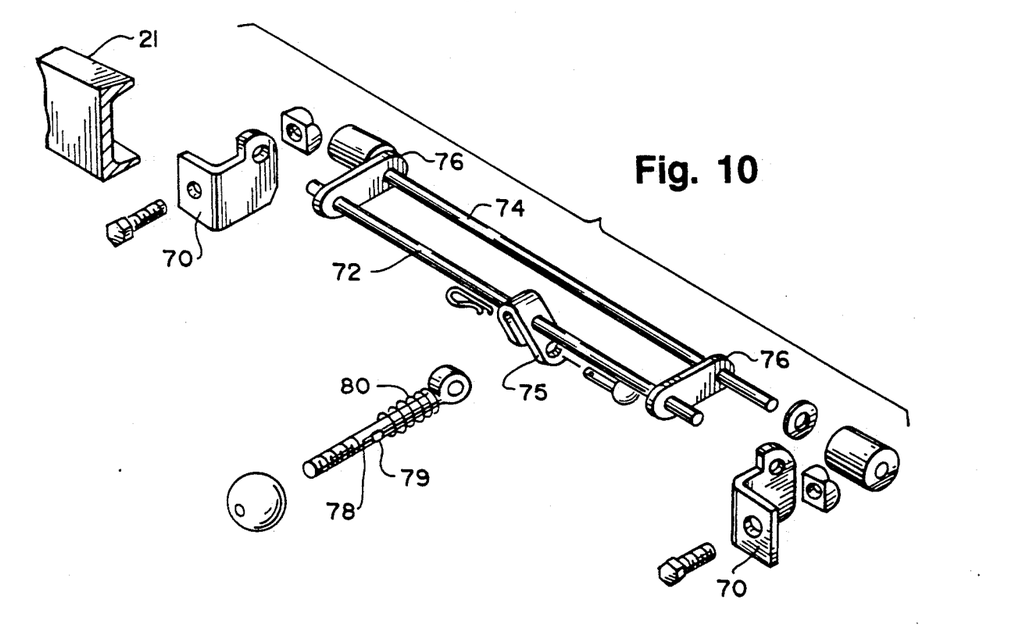

An alternate embodiment of release mechanism 16, although others are within the scope of the present invention, is shown in FIG. 10. In this embodiment, release mechanism 16 is operably secured to the rear side of front aisle beam 21 which may consist of a channel member as in FIG. 10 (or other structural members that will be known to those of ordinary skill in the art). A pair of bearing brackets 70, a fixed axle 72, a free axle 74 and a handle 78 are also provided. Each end of fixed axle 72 is rotatably mounted in a bearing bracket 70, which is in turn mounted to the rear side of front aisle beam 21 in a manner that will be well understood by those of ordinary skill in the art. A plurality of links 76 are provide which are rigidly secured at one end to fixed axle 72 and are rotatably mounted to free axle 74 at the other end. Free axle 74 is rotatably mounted to the forward ends of links 76 and each end of free axle 74 is provided with a resilient bumper 77. Handle 78 is rotatably secured to an actuator bracket 75 at one end, operably projects to the front through (or underneath) front aisle beam 21 to a free end. Actuator bracket 75 is rigidly secured to fixed axle 72. Handle 78 is further provided with a slot 79 that acts as a lock, as well as spring 80 which is positioned along handle 78 between actuator bracket 75 and front aisle beam 21. Similar to the release mechanism shown in FIG. 8, to operate, slot 79 is disengaged from front aisle beam 21 and handle 78 is pulled forward. After activation and transfer, a spring 80 biases handle 78 forward to engage slot 79 on front aisle beam 21 and is thus automatically returned to a stop position.

Figures 1A, 1B:
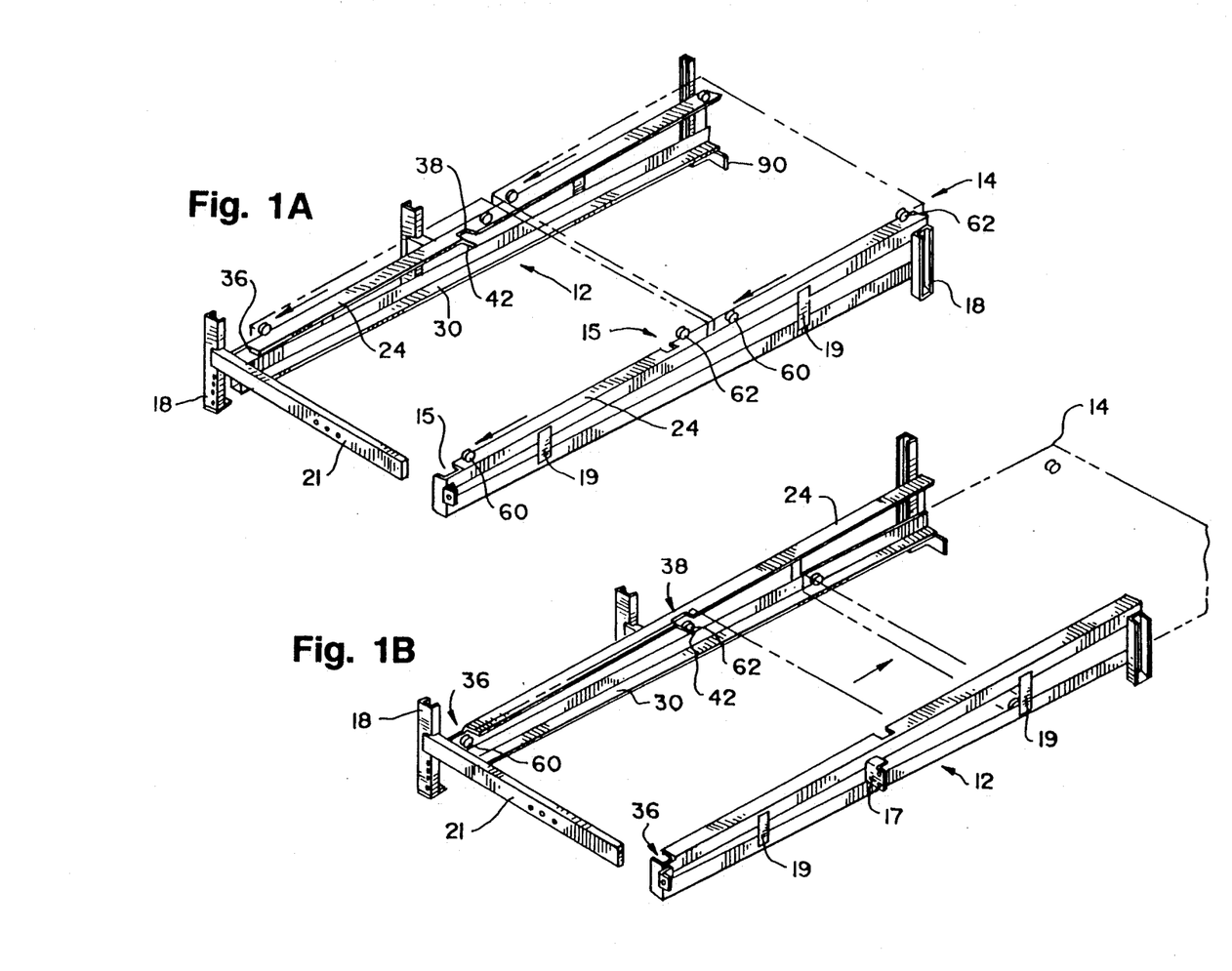
FIG. 1A is an exploded perspective view of the present invention showing a representative view of two carts in a loaded storage position.
FIG. 1B is an exploded perspective view of the present invention showing a representative view of one cart during the transfer process and one cart in a loading or storage position.

The overall operation of the present invention may be seen by reference to FIGS. 1, 1A and 1B. A pallet and load is placed upon cart 14 which is placed in rolling engagement with feed rails 20. The forward slope of feed rails 20 causes cart 14 to travel forward along feed rails 20 until the front stop 58 or front member 52 is engaged by free axle 74 and resilient bumpers 77 of release mechanism 16 to its storage position where the front wheels 60 and rear wheels 62 of cart 14 are in a position as schematically shown in FIGS. 1A and 3. A second or more loaded carts may be similarly placed in rolling engagement with feed rails 20 behind cart assembly 14 for additional storage.

When desired, the load is removed from cart assembly 14. Thereafter, cart assembly 14 and its associated pallet may be transferred to the return rails 22 by activation of release mechanism 16. Additionally, because of the unique structure of release mechanism 16, the forces acting upon free axle 74 from cart assembly 14 (and any other carts positioned behind it) actually aid in the ease of operation of the release mechanism 16.

Upon activation of release mechanism 16, cart assembly 14 is permitted to advance to its most forward position where front wheels 60 fall through front notches 36 and rear wheels 62 fall through rear notches 38 and cart assembly 14 thereby transferred to a rolling engagement with return rails 22. Smoother transfer may be accomplished through front return ramp 40 and rear return ramps 42. The unloaded cart assembly 14 and its pallet then automatically roll rearward to and are stopped at the loading end by a rear stop 90, where cart 14 may be thereafter repositioned for further storage as shown in FIG. 1B. After transfer, release mechanism 16 is biased into a closed position to engage a second cart and its load for storage.

In this manner, the unloading of stored products may take place in a single aisle. All loading of the carts 14 is done from a single rear aisle. Because of the automatic transfer and return feature, the unloading operator does not have to remove carts 14 or pallets (not shown) from the system while in the unloading aisle and thus obstruct or slow down the unloading process. Unloaded carts 14 and pallets are automatically returned to the loading end for subsequent use.

Transfer of carts 14 may also be effected in a manner different from the described proportioned notches. For example, the selective sizing of the wheels 60 and 62 of cart 14 such that notches 36 and 38 are of the same depth, but different width. Front wheels 60 may be larger than rear wheels 62 and rear notches 38 a smaller width than front wheels 60. In this manner, front wheels 60 can roll over rear notches 38 to the stopped position. In addition, notches 36 and 38 may be covered with plates or the like, said plates being selectively activated to effectuate release and transfer.

While preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A pallet return pallet rack system comprising:
   at least one pair of spaced, parallel feed rails having rolling surfaces;
   at least one pair of spaced, parallel return rails having rolling surfaces and positioned below said feed rails;
   at least one cart having wheels for rolling engagement with said rolling surface of said feed rails;
   a means to transfer said cart from said feed rails to said return rails such that said cart is in rolling engagement with said return rails; and
   a release mechanism for enabling the transfer of said cart from said feed rails to said return rails.

2. The invention of claim 1 wherein said pair of feed rails define a pallet unloading end and a pallet loading end, said feed rails sloping upward at a shallow angle from said unloading end to said loading end.

3. The invention of claim 2 wherein said pair of return rails define a pallet unloading end and a pallet loading end, said return rails sloping downward at a shallow angle from said unloading end to said loading end.

4. The invention of claim 3 wherein at least one cart includes a guide means for keeping said cart in desired lateral alignment with said feed rails and said return rails.

5. The invention of claim 3 wherein said means to transfer includes feed rails having a pair of front notches and a pair of rear notches to permit said cart to transfer from said feed rails to said return rails.

6. The invention of claim 5 wherein said means to transfer also includes a pair of front ramps positioned below said front notches to aid in the transfer of said cart from said feed rails to said return rails.

7. The invention of claim 6 wherein said feed rails are constructed from a member having at least one generally horizontal surface.

8. The invention of claim 6 wherein said return rails are constructed from a member having at least one generally horizontal surface.

9. The invention of claim 1 wherein said cart includes a means to retain a pallet on said cart.

10. The invention of claim 1 wherein said release mechanism includes a rotatable axle.

11. The invention of claim 1 wherein said release mechanism includes at least one rotatably mounted resilient bumper.

12. The invention of claim 3 wherein said return rails include a rear stop.

13. The invention of claim 3 wherein the cart includes a guide means for keeping said cart in alignment with said return rails upon transfer of said cart from said feed rails.

14. A pallet return pallet rack system having a loading end and an unloading end, comprising:
    at least one pair of spaced, parallel feed rails sloping gradually downward from the loading end to the unloading end;
    at least one pair of spaced, parallel return rails sloping gradually downward from the unloading end to the loading end, said return rails being positioned below said feed rails and adjacent to said feed rails at said loading end;
    at least one cart having wheels for rolling engagement with said rolling surface of said feed rails and said return rails;
    a means to transfer said cart from said feed rails to said return rails; and,
    a release means for selectively enabling transfer of said carts from said feed rails to said return rails.

15. The invention of claim 14 wherein said means to transfer comprises said feed rails having a pair of front notches and a pair of rear notches to enable said wheels of said cart to pass through said notches and access to said return rails.

16. The invention of claim 15 wherein said feed rails and said return rails are angle members.

17. The invention of claim 15 having a guide means to keep said cart in lateral alignment with said feed rails and said return rails during rolling operation and transfer.

18. The invention of claim 14 wherein said release means includes a rotatable axle.

19. The invention of claim 18 wherein said release means further includes resilient bumpers attached to said rotatable axle, a fixed axle, a plurality of links connecting said fixed axle and said rotatable axle, a handle, and a bracket means to operably connect said release means to an aisle beam.

20. The invention of claim 14 wherein said means to transfer operably includes said release means.

21. A pallet return pallet rack system comprising:
    at least one pair of spaced, parallel feed rails having rolling surfaces;
    at least one pair of spaced, parallel return rails having rolling surfaces and positioned below said feed rails;
    at least one cart having wheels for rolling engagement with said rolling surfaces; and,
    a means to transfer said cart from said feed rails to said return rails wherein said cart is in rolling engagement with said return rails.

22. The invention of claim 20 including a release mechanism for enabling the transfer of said cart from said feed rails to said return rails.

23. The invention of claim 20 including a guide means to aid in proper alignment and operation of said cart with said feed rails and said return rails during rolling operation of said cart and during transfer.

* * * * *